(12) United States Patent
Je et al.

(10) Patent No.: US 9,762,575 B2
(45) Date of Patent: Sep. 12, 2017

(54) METHOD FOR PERFORMING COMMUNICATION VIA FINGERPRINT AUTHENTICATION AND ELECTRONIC DEVICE THEREOF

(71) Applicant: Samsung Electronics Co., Ltd., Gyeonggi-do (KR)

(72) Inventors: Seong-Min Je, Gyeonggi-do (KR); Sun-Min Hwang, Gyeonggi-do (KR); Jeong-Min Park, Gyeonggi-do (KR); Ji-Yoon Park, Gyeonggi-do (KR); Seung-Eun Lee, Seoul (KR)

(73) Assignee: SAMSUNG ELECTRONIC CO., LTD., Suwon-si (KR)

( * ) Notice: Subject to any disclaimer, the term of this patent is extended or adjusted under 35 U.S.C. 154(b) by 0 days.

(21) Appl. No.: 14/588,186

(22) Filed: Dec. 31, 2014

(65) Prior Publication Data
US 2015/0271175 A1    Sep. 24, 2015

(30) Foreign Application Priority Data

Mar. 21, 2014  (KR) .................. 10-2014-0033311

(51) Int. Cl.
| | | |
|---|---|---|
| H04L 29/06 | (2006.01) | |
| G06K 9/00 | (2006.01) | |
| H04W 12/06 | (2009.01) | |
| H04W 4/00 | (2009.01) | |

(52) U.S. Cl.
CPC ...... *H04L 63/0861* (2013.01); *G06K 9/00087* (2013.01); *G06K 9/00979* (2013.01); *H04L 63/102* (2013.01); *H04W 12/06* (2013.01); *H04W 4/008* (2013.01)

(58) Field of Classification Search
CPC .............. H04L 63/0861; H04L 63/101; G06F 17/30268
See application file for complete search history.

(56) References Cited

U.S. PATENT DOCUMENTS

| | | | | |
|---|---|---|---|---|
| 7,460,109 | B2* | 12/2008 | Safai ................... | G06F 3/03547 345/173 |
| 8,140,505 | B1* | 3/2012 | Jain ................... | G06F 17/30864 707/706 |
| 9,148,742 | B1* | 9/2015 | Koulomzin ............. | H04W 4/00 |
| 9,218,472 | B2* | 12/2015 | Alameh ................. | G06F 21/32 |
| 2008/0013795 | A1* | 1/2008 | Ito ...................... | G06K 9/00885 382/115 |
| 2009/0023410 | A1* | 1/2009 | Ghosh .................. | G06F 3/0231 455/226.2 |

(Continued)

FOREIGN PATENT DOCUMENTS

| | | |
|---|---|---|
| KR | 10-2012-0116902 | 10/2012 |
| KR | 10-2013-0005789 | 1/2013 |

*Primary Examiner* — Ali Shayanfar

(57) ABSTRACT

A method is provided for operating a first electronic device. The method includes determining sameness of first fingerprint data and second fingerprint data. The method also includes obtaining an access right of a security region based on the determination. The method also includes obtaining at least one item of information stored in the security region based on the obtained access right. The method also includes transmitting the obtained information to a second electronic device connected via Near Field Communication.

16 Claims, 10 Drawing Sheets

(56) References Cited

U.S. PATENT DOCUMENTS

| | | | |
|---|---|---|---|
| 2009/0191846 A1* | 7/2009 | Shi | G06F 21/32 455/411 |
| 2010/0050241 A1* | 2/2010 | Yan | G06F 21/10 726/5 |
| 2010/0067037 A1* | 3/2010 | Takiyama | G06F 21/32 358/1.14 |
| 2010/0159880 A1* | 6/2010 | Tischer | H04L 12/66 455/411 |
| 2010/0250944 A1* | 9/2010 | Suzuki | G06F 21/32 713/172 |
| 2010/0303311 A1* | 12/2010 | Shin | G06K 9/036 382/124 |
| 2011/0001607 A1* | 1/2011 | Kamakura | G06K 9/00087 340/5.82 |
| 2011/0129128 A1* | 6/2011 | Makimoto | G06K 9/00013 382/124 |
| 2011/0273267 A1* | 11/2011 | Bong | G06F 3/016 340/5.53 |
| 2011/0289567 A1* | 11/2011 | Bauer-Hermann | H04L 63/0853 726/6 |
| 2012/0159599 A1* | 6/2012 | Szoke | G06F 21/35 726/7 |
| 2013/0080238 A1* | 3/2013 | Kelly | G07F 17/3255 705/14.31 |
| 2013/0097008 A1* | 4/2013 | Kaniel | G06Q 50/01 705/14.41 |
| 2013/0129161 A1* | 5/2013 | Goel | G06F 21/32 382/124 |
| 2013/0208103 A1* | 8/2013 | Sands | G06F 21/31 348/78 |
| 2013/0346068 A1* | 12/2013 | Solem | G06F 17/30268 704/9 |
| 2014/0003680 A1* | 1/2014 | Marciniak | G06K 9/0008 382/124 |
| 2014/0013406 A1* | 1/2014 | Tremlet | G06F 21/32 726/5 |
| 2014/0157392 A1* | 6/2014 | Smith | H04L 63/08 726/9 |
| 2015/0067327 A1* | 3/2015 | Lipton | H04L 63/083 713/168 |
| 2015/0113617 A1* | 4/2015 | Chastain | G06F 21/31 726/6 |

\* cited by examiner

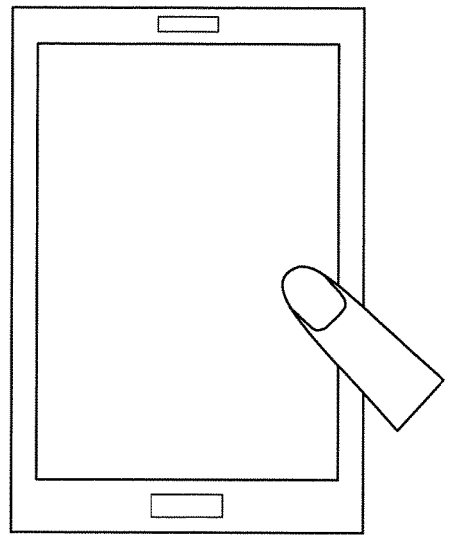 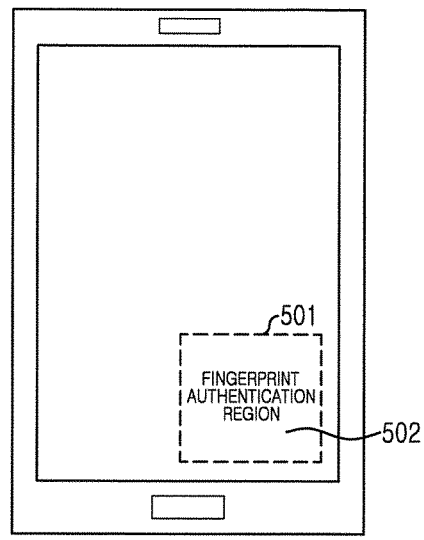
FIG.5A  FIG.5B
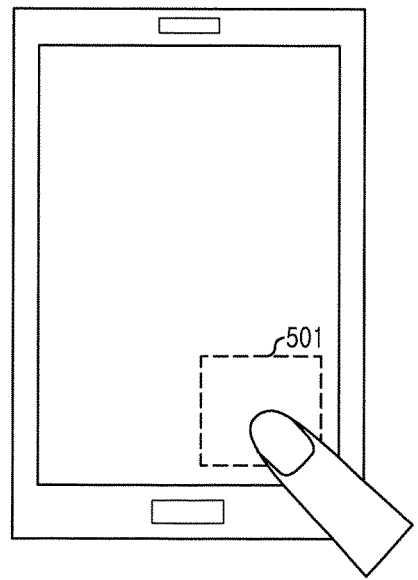
FIG.5C

METHOD FOR PERFORMING COMMUNICATION VIA FINGERPRINT AUTHENTICATION AND ELECTRONIC DEVICE THEREOF

PRIORITY

The present application is related to and claims the benefit under 35 U.S.C. §119(a) of a Korean patent application No. 10-2014-0033311 filed in the Korean Intellectual Property Office on Mar. 21, 2014, the entire disclosure of which is hereby incorporated by reference.

TECHNICAL FIELD

The present disclosure relates to an electronic device and a method for performing near field communication.

BACKGROUND

As a function of an electronic device develops, near field communication with another electronic device becomes possible. For example, when a user intends to transmit a file stored in an electronic device to another electronic device, the user may conveniently transmit the file with only an operation of tagging another electronic device.

Also, as portability of an electronic device is emphasized, a user's personal information is stored in the electronic device and the stored personal information may be easily utilized when the user needs it. For example, a user may store credit card information in an electronic device and utilize it as a payment means when using public transportation or after purchasing goods.

SUMMARY

A file stored in an electronic device may be easily shared with another electronic device via near field communication, and the like, but when the file stored in the electronic device is personal information important to a user, a method for authentication this is used.

For example, when performing near field communication with a payment terminal using a user's credit card information stored in an electronic device, an accurate authentication process for a user himself who uses the electronic device does not exist, such that there is no preparation for robbery, and the like.

To address the above-discussed deficiencies, it is a primary object to provide an apparatus and a method for reinforcing security by giving an access right that may access a security region where personal information has been stored only if a fingerprint recognized by an electronic device coincides with a stored user's fingerprint.

Various embodiments of the present disclosure may provide an apparatus and a method for easily recognizing a fingerprint regardless of various habits of a user gripping an electronic device since the user may arbitrarily set a fingerprint recognition region that recognizes the user's fingerprint in the electronic device.

Various embodiments of the present disclosure may provide an apparatus and a method for improving a user's convenience by performing an operation of recognizing a fingerprint in an electronic device and an operation of performing near field communication with another electronic device as one operation without discriminating the operations, separately.

In accordance with an aspect of the present disclosure, a method is provided for operating a first electronic device. The method may include determining sameness of input first fingerprint data and stored second fingerprint data. The method may also include, when it is determined that the first fingerprint data and the second fingerprint data are the same, obtaining an access right of a security region. The method may also include obtaining at least one item of personal information stored in the security region to transmit the obtained personal information to a second electronic device performing near field communication.

In accordance with another aspect of the present disclosure, an embodiment provides a first electronic device. The first electronic device may include a processor for determining sameness of input first fingerprint data and stored second fingerprint data, and when it is determined that the first fingerprint data and the second fingerprint data are the same and obtaining an access right of a security region. The first electronic device may also include a communication module for obtaining at least one item personal information stored in the security region to transmit the obtained personal information to a second electronic device performing near field communication.

Other aspects, advantages and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5A-5C illustrate views of receiving a user's fingerprint data according to various embodiments of the present disclosure;

Throughout the drawings, like reference numerals will be understood to refer to like parts, components and structures.

DETAILED DESCRIPTION

Figure 1:
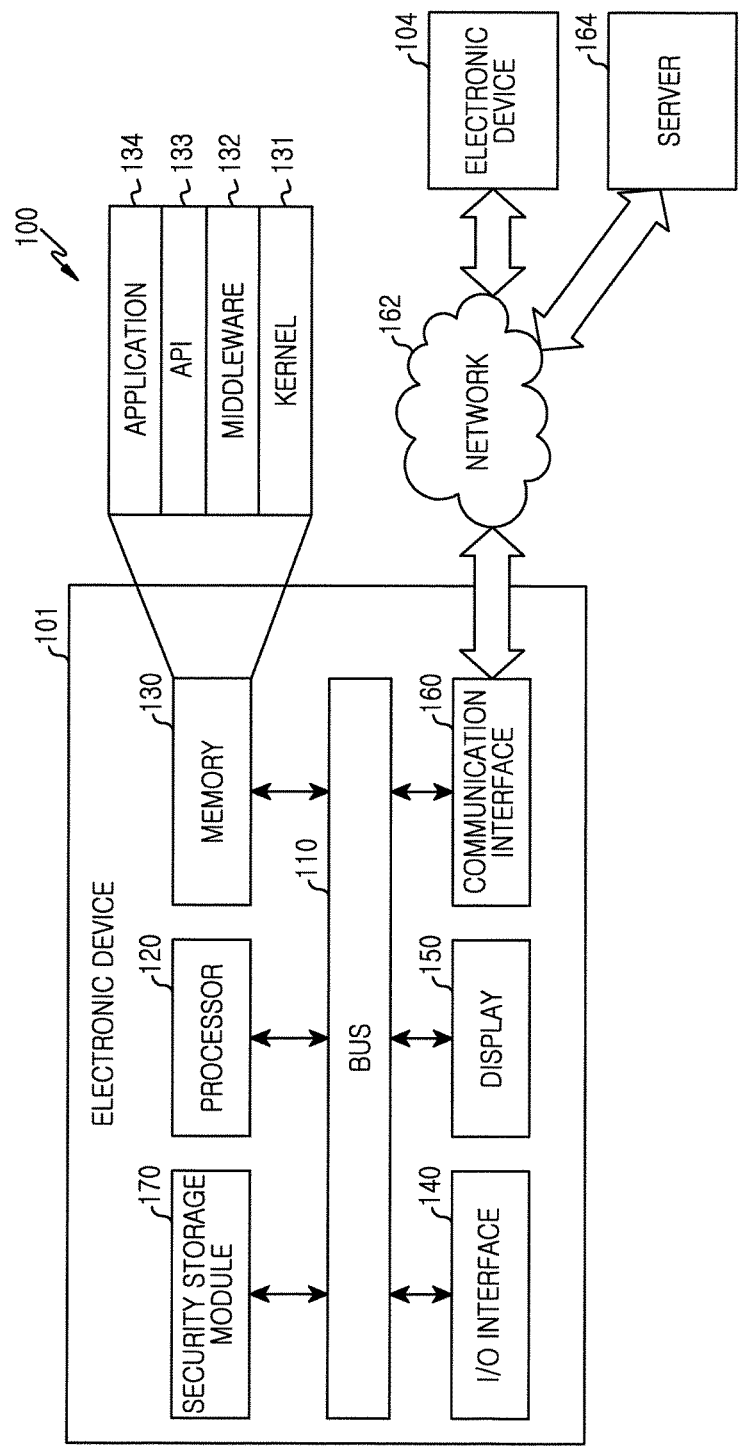
FIG. 1 illustrates a view showing a network environment including an electronic device 101 according to various embodiments.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Expressions such as "include" or "may include", and the like that may be used for various embodiments of the present disclosure indicate existence of a disclosed relevant function, operation, or element, and the like, and do not limit additional one or more functions, operations, or elements, and the like. Also, it should be understood that terminologies such as "include" or "have", and the like in various embodiments of the present disclosure are intended for designating existence of a characteristic, a number, a step, an operation, an element, a part, or a combination of these described on the specification and do not exclude in advance existence or addition possibility of one or more other characteristics, numbers, steps, operations, elements, parts, or a combination of these.

Expression such as "or", "at least one of A or/and B", and the like in various embodiments of the present disclosure includes a certain and all combinations of words listed together. For example, each of "A or B" or "at least one of A or/and B" may include A and may include B, or include both A and B.

Expression such as "or", and the like in various embodiments of the present disclosure includes a certain and all combinations of words listed together. For example, "A or B" may include A and may include B, or include both A and B.

In various embodiments of the present disclosure, expressions such as "1st", "2nd", "first" or "second", and the like may modify various elements of various embodiments but do not limit relevant elements. For example, the expressions do not limit sequence and/or importance, and the like of relevant elements. The expressions may be used for discriminating one element from another element. For example, both a first user apparatus and a second user apparatus are all user apparatuses, and represent different user apparatuses. For example, a first element may be named as a second element without departing from the scope of various embodiments of the present disclosure, and similarly, the second element may be named as the first element.

When it is mentioned that a certain element is "connected to" or "accesses" another element, it should be understood that the certain element may be directly connected to another element or may directly access another element, but still another element may exist between the certain element and another element. In contrast, when it is mentioned that a certain element is "directly connected to" or "directly accesses" another element, it should be understood that still another element does not exist between the certain element and another element.

A terminology used in various embodiments of the present disclosure is used for explaining only a specific embodiment and is not intended for limiting the various embodiments of the present disclosure. Unless clearly expressed otherwise, expression of the singular includes expression of the plural.

Unless defined differently, all terminologies used herein including technological or scientific terminologies have the same meaning as that generally understood by a person of ordinary skill in the art to which various embodiments of the present disclosure belong. It should be understood that generally used terminologies defined by a dictionary have meaning coinciding with meaning on context of a related technology, and unless clearly defined in various embodiments of the present disclosure, they are not understood as an ideal or excessively formal meaning.

An electronic device according to various embodiments of the present disclosure may be a device including a communication function. For example, an electronic device may include at least one of a smartphone, a tablet personal computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, or a wearable device (ex: a head-mounted-device (HMD) such as electronic glasses, an electronic clothing, an electronic bracelet, an electronic necklace, an electronic appcessory, an electronic tattoo, or a smartwatch).

According to certain embodiments, an electronic device may be a smart home appliance having a communication function. A smart home appliance may include, for example, at least one of a television, a Digital Video Disk (DVD) player, an audio, a refrigerator, an air conditioner, a cleaner, an oven, an electronic range, a washing machine, an air purifier, a set-top box, a TV box (for example, Samsung HomeSync™, Apple TV™, or Google TV™), game consoles, an electronic dictionary, an electronic key, a camcorder, or an electronic frame.

According to certain embodiments, an electronic device may include at least one of various medical devices (ex: Magnetic Resonance Angiography (MRA), Magnetic Resonance Imaging (MRI), Computed Tomography (CT), a shooting device, an ultrasonic device, and the like), a navigation device, a Global Positioning System (GPS) receiver, an event data recorder (EDR), a flight data recorder (FDR), an automobile infotainment device, electronic equipment for a ship (ex: a navigation device for a ship, a gyro compass, and the like), an avionics, a security device, a head unit for a vehicle, a robot for an industrial use or a home use, an automatic teller's machine (ATM) of a financial institute, or a point of sales (POS) of a store.

According to certain embodiments, an electronic device may include at least one of a furniture or a portion of a building/structure including a communication function, an electronic board, an electronic signature receiving device, a projector, or various measurement devices (ex: waterworks, electricity, gas, or radio wave measuring device, and the like). An electronic device according to various embodiments of the present disclosure may be a combination of one or more of the above-described devices. Also, an electronic device according to various embodiments of the present disclosure may be a flexible device. Also, it is obvious to a person of ordinary skill in the art that the electronic device according to various embodiments of the present disclosure is not limited to the above-described devices.

Hereinafter, an electronic device according to various embodiments is described with reference to the accompanying drawings. A terminology of a user used in various embodiments may indicate a person who uses an electronic device or a device (ex: an artificial intelligence electronic device) that uses the electronic device.

FIG. 1 illustrates a view showing a network environment including an electronic device 101 according to various embodiments. Referring to FIG. 1, the electronic device 101 may include a bus 110, a processor 120, a memory 130, an input/output (I/O) interface 140, a display 150, a communication interface 160, a security storage module 170, and a contents detection module 180. The bus 110 may be a circuit for connecting the above-described elements with each other, and transferring communication (ex: a control message) between the above-described elements.

The processor 120 may receive, for example, an instruction from the above-described other elements (ex: the memory 130, the I/O interface 140, the display 150, the communication interface 160, or the security storage module 170, and the like) via the bus 110, decipher the received instruction, and execute an operation or a data process corresponding to the deciphered instruction.

The memory 130 may store an instruction or data received from the processor 120 or other elements (ex: the I/O interface 140, the display 150, the communication interface 160, or the security storage module 170, and the like), or generated by the processor 120 or other elements. The memory 130 may include, for example, programming modules such as a kernel 131, a middleware 132, an application programming interface (API) 133, or an application 134. The each of the programming modules may be configured using software, firmware, hardware, or a combination of two or more of these.

The kernel 131 may control or manage system resources (ex: the bus 110, the processor 120, or the memory 130, and the like) used for executing an operation or a function implemented in the rest of the programming modules, for example, the middleware 132, the API 133, or the application 134. Also, the kernel 131 may provide an interface for allowing the middleware 132, the API 133, or the application 134 to access an individual element of the electronic device 101 and control or manage the same.

The middleware 132 may perform a mediation role such that the API 133 or the application 134 may communicate with the kernel 131 to give and take data. Also, in connection with task requests received from the applications 134, the middleware 132 may perform a control (ex: scheduling or load balancing) for a task request using, for example, a method of assigning priority that may use a system resource (ex: the bus 110, the processor 120, or the memory 130, and the like) of the electronic device 101 to at least one of the applications 134.

The API 133 is an interface for allowing the application 134 to control a function provided by the kernel 131 or the middleware 132, and may include at least one interface or function (ex: an instruction) for file control, window control, image processing, or character control, and the like.

According to various embodiments, the application 134 may include an SMS/MMS application, an e-mail application, a calendar application, alarm application, a health care application (ex: an application for measuring quantity of motion or blood sugar, and the like), or an environment information application (ex: an application providing atmospheric pressure, humidity or temperature information, and the like). Additionally or alternatively, the application 134 may be an application related to information exchange between the electronic device 101 and an external electronic device (ex: the electronic device 104). The application related to the information exchange may include, for example, a notification relay application for transferring specific information to the external electronic device or a device management application for managing the external electronic device.

For example, the notification relay application may include a function for transferring notification information generated from a different application (ex: an SMS/MMS application, an e-mail application, a health care application, or an environment information application) of the electronic device 101 to an external electronic device (ex: the electronic device 104). Additionally or alternatively, the notification relay application may, for example, receive notification information from an external electronic device (ex: the electronic device 104) and provide the same to a user. The device management application may manage (ex: install, delete, or update) a function (ex: turn-on/turn-off of an external electronic device itself (or some constituent part) or luminance (or resolution) control of a display) and an application operating in the external electronic device or a service (ex: a communication service or a message service) provided by the external electronic device.

According to various embodiments of the present disclosure, the application 134 may include a designated application depending on an attribute (ex: a kind of an electronic device) of the external electronic device (ex: the electronic device 104). For example, when the external electronic device is an MP3 player, the application 134 may include an application related to music reproduction. Similarly, when the external electronic device is a mobile medical health care device, the application may include an application related to health care. According to an embodiment, the application 134 may include at least one of an application designated in the electronic device 101 and an application received from the external electronic device (ex: the server 106 or the electronic device 104).

The I/O interface 140 may transfer an instruction or data input from a user via an I/O unit (ex: a sensor, a keyboard, or a touchscreen) to the processor 120, the memory 130, the communication interface 160, or the security storage module 170 via the bus 110, for example. For example, the I/O interface 140 may provide data regarding a user's touch input via the touchscreen to the processor 120. Also, the I/O interface 140 may, for example, output an instruction or data received via the bus 110 from the processor 120, the memory 130, and the communication interface 160, or the security storage module 170 via the I/O unit (ex: a speaker or a display). For example, the I/O interface 140 may output voice data processed by the processor 120 to a user via a speaker.

The display 150 may display various information (ex: multimedia data or text data, and the like) to a user.

The communication interface 160 may connect communication between the electronic device 101 with an external device (ex: the electronic device 104 or the server 106). For example, the communication interface 160 may be connected with a network 162 via wireless communication or wired communication to communicate with the external device. The wireless communication may, for example, include at least one of Wireless Fidelity (Wi-Fi), Bluetooth (BT), Near Field Communication (NFC), Global Positioning System (GPS), or cellular communication (ex: LTE, LTE-A, CDMA, WCDMA, UMTS, WiBro, or GSM, and the like). The wired communication may include, for example, at least one of Universal Serial Bus (USB), High Definition Multimedia Interface (HDMI), recommended standard 232 (RS-232), and plain old telephone service (POTS).

According to an embodiment, the network 162 may be a telecommunications network. The telecommunications network may include at least one of a computer network, the Internet, an Internet of things, and a telephone network. According to an embodiment, a protocol (ex: a transport layer protocol, a data link layer protocol, or a physical layer protocol) for communication between the electronic device 101 and an external device may be supported by at least one of the application 134, the application programming interface 133, the middleware 132, the kernel 131, or the communication interface 160.

The security storage module 170 may store personal information of a user of an electronic device. According to an embodiment, the security storage module 170 may store a user's resident registration number information, passport number information, class information, employee information, door lock authentication key information, credit information used for a credit card, ID and password information used for each information, and the like. According to an embodiment, the security storage module 170 may include an embedded region storing personal information on an applet basis. According to an embodiment, the electronic device may store at least one item of personal information in a security region on an applet basis, and management of an applet may be performed depending on a key of a Security Domain (SD). According to an embodiment, the security storage module 170 may be a protected storage area such as an embedded Secure Element (eSE) region. According to an embodiment, as illustrated in FIG. 1, the security storage module 170 may be provided separately, and provided inside the communication interface 160. According to an embodiment, the security storage module 170 may write personal information stored in the electronic device in the memory 130, and then perform communication via the communication interface 160.

Figure 2:
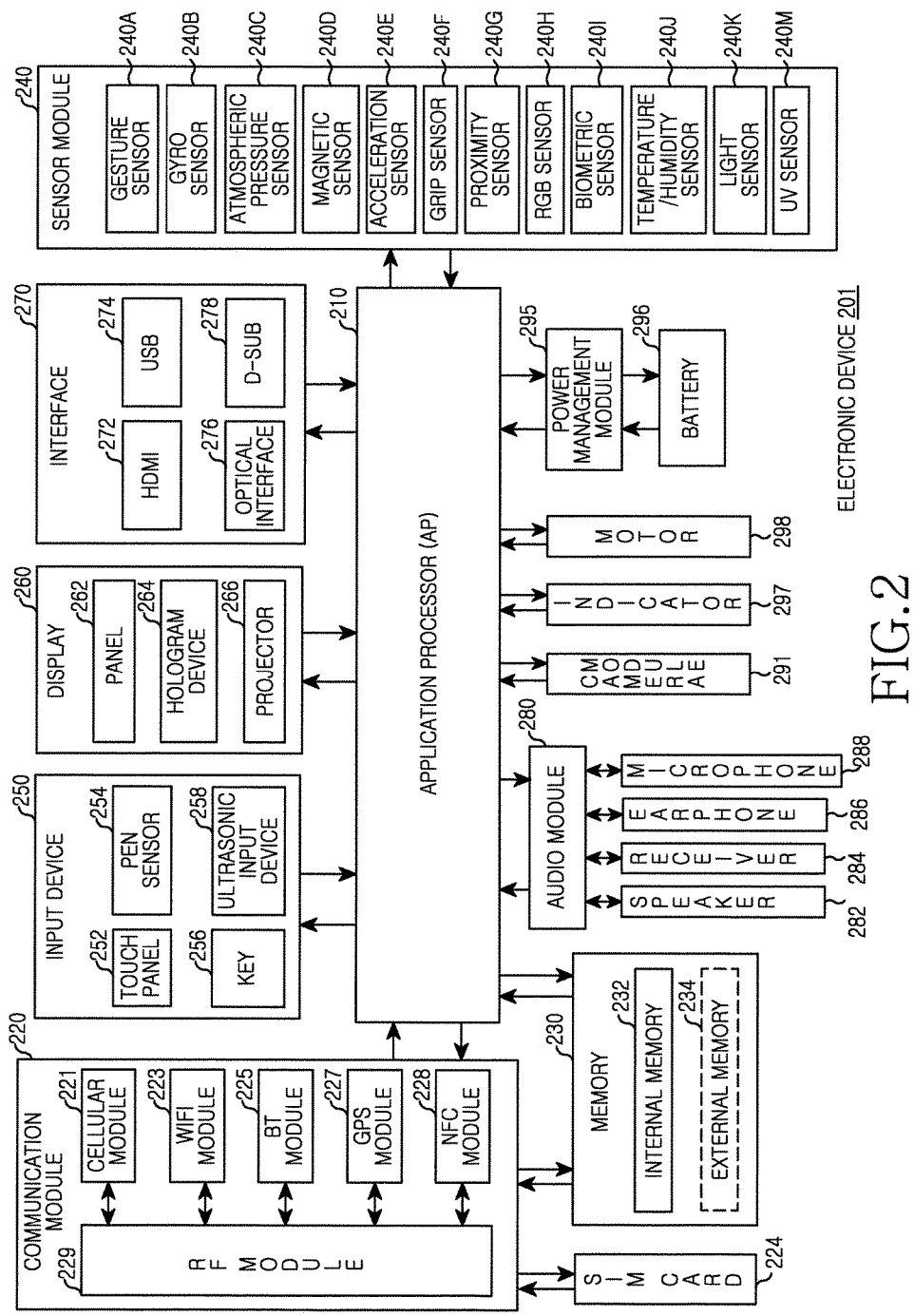
FIG. 2 illustrates a block diagram showing a hardware according to an embodiment of the present disclosure.

FIG. 2 illustrates a block diagram 200 showing an electronic device 201 according to an embodiment of the present disclosure. The electronic device 201 may configure, for example, all or a portion of the electronic device 101 illustrated in FIG. 1. Referring to FIG. 2, the electronic device 201 may include one or more application processors (APs) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, and a motor 298.

The AP 210 may drive an Operating System (OS) or an application to control a plurality of hardware and software elements connected to the AP 210, and perform various data processing including multimedia data and an operation. The AP 210 may be, for example, implemented as a System on Chip (SoC). According to an embodiment, the AP 210 may further include a Graphic Processing Unit (GPU) (not shown).

The communication module 220 (ex: the communication interface 160) may perform data transmission/reception in communication between the electronic device 201 and other electronic devices (ex: the electronic device 104 or the server 106) connected via a network. According to an embodiment, the communication module 220 may include a cellular module 221, a Wi-Fi module 223, a BT module 225, a GPS module 227, an NFC module 228, and a Radio Frequency (RF) module 229.

The cellular module 221 may provide voice communication, image communication, a short message service, or an Internet service, and the like via a communication network (ex: LTE, LTE-A, CDMA, WCDMA, UMTS, WiBro, or GSM, and the like). Also, the cellular module 221 may perform discrimination and authentication of an electronic device within a communication network using, for example, a subscriber identity module (ex: a SIM card 224). According to an embodiment, the cellular module 221 may perform at least a portion of functions that may be provided by the AP 210. For example, the cellular module 221 may perform at least a portion of a multimedia control function.

According to an embodiment, the cellular module 221 may include a communication processor (CP). Also, the cellular module 221 may be, for example, implemented as an SoC. Though elements such as the cellular module 221 (ex: a communication processor), the memory 230, or the power management module 295, and the like are illustrated as elements separated from the AP 210 in FIG. 2, according to an embodiment, the AP 210 may be implemented to include at least a portion (ex: the cellular module 221) of the above-described elements.

According to an embodiment, the AP 210 or the cellular module 221 (ex: a communication processor) may load an instruction or data received from at least one of a non-volatile memory and other elements connected thereto onto a volatile memory, and process the same. Also, the AP 210 or the cellular module 221 may store data received from at least one of other elements or generated by at least one of other elements in a non-volatile memory.

Each of the Wi-Fi module 223, the BT module 225, the GPS module 227, or the NFC module 228 may include, for example, a processor for processing data transmitted/received via a relevant module. Though the cellular module 221, the Wi-Fi module 223, the BT module 225, the GPS module 227, or the NFC module 228 are illustrated as separate blocks in FIG. 2, according to an embodiment, at least a portion (ex: two or more elements) of the cellular module 221, the Wi-Fi module 223, the BT module 225, the GPS module 227, or the NFC module 228 may be included in one Integrated Circuit (IC) or an IC package. For example, at least a portion (ex: a communication processor corresponding to the cellular module 221 and a Wi-Fi processor corresponding to the Wi-Fi module 223) of processors corresponding to each of the cellular module 221, the Wi-Fi module 223, the BT module 225, the GPS module 227, or the NFC module 228 may be implemented as one SoC.

The RF module 229 may perform transmission/reception of data, for example, transmission/reception of an RF signal. The RF module 229 may include, for example, a transceiver, a power amp module (PAM), a frequency filter, or a low noise amplifier (LNA), and the like, though not shown. Also, the RF module 229 may further include a part for transmitting/receiving an electromagnetic wave on a free space in wireless communication, for example, a conductor or a conducting line, and the like. Though FIG. 2 illustrates the cellular module 221, the Wi-Fi module 223, the BT module 225, the GPS module 227, and the NFC module 228 share one RF module 229, according to an embodiment, at least one of the cellular module 221, the Wi-Fi module 223, the BT module 225, the GPS module 227, or the NFC module 228 may perform transmission/reception of an RF signal via a separate RF module.

The SIM card 224 may be a card including a subscriber identify module, and may be inserted into a slot formed in a specific position of the electronic device. The SIM card 224 may include unique identify information (ex: integrated circuit card identifier (ICCID)) or subscriber information (ex: international mobile subscriber identity (IMSI)).

The memory 230 (ex: the memory 130) may include a built-in memory 232 or an external memory 234. The built-in memory 232 may include, for example, at least one of a volatile memory (ex: dynamic RAM (DRAM), static RAM (SRAM), synchronous dynamic RAM (SDRAM)) and a non-volatile memory (ex: one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, and the like).

According to an embodiment, the built-in memory 232 may be a Solid State Drive (SSD). The external memory 234 may further include a flash drive, for example, compact flash (CF), secure digital (SD), micro secure digital (Micro-SD), mini secure digital (Mini-SD), extreme digital (xD), or a memory stick. The external memory 234 may be functionally connected with the electronic device 201 via various interfaces. According to an embodiment, the electronic device 201 may further include a storage device (or a storage medium) such as a hard drive.

The sensor module 240 may measure a physical quantity or detect an operation state of the electronic device 201, and convert the measured or detected information to an electric signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240I1 (ex: RGB (red, green, blue) sensor), a living body sensor 240I, a temperature/humidity sensor 240J, an illuminance sensor 240K, or an ultra violet (UV) sensor 240M. Additionally or alternatively, the sensor module 240 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), and the like. The sensor module 240 may further include a control circuit for controlling at least one sensor belonging thereto.

The input unit 250 may include a touch panel 252, a (digital) pen sensor 254, a key 256, or an ultrasonic input unit 258. The touch panel 252 may recognize a touch input using at least one of capacitive, resistive, infrared, or ultrasonic methods. Also, the touch panel 252 may further include a control circuit. A capacitive touch panel may perform detection by a physical contact or proximity recognition. The touch panel 252 may further include a tactile layer. In this embodiment, the touch panel 252 may provide a tactile reaction to a user.

The (digital) pen sensor 254 may be implemented using, for example, a method which is the same as or similar to receiving a user's touch input, or using a separate sheet for detection. The key 256 may include, for example, a physical button, an optical key or keypad. The ultrasonic input unit 258 is a unit for recognizing data by detecting a sound wave using a microphone (ex: a microphone 288) in the electronic device 201 via an input tool generating an ultrasonic signal, and enables wireless recognition. According to an embodiment, the electronic device 201 may receive a user input from an external device (ex: a computer or a server) connected to the communication module 220 using the communication module 220.

The display 260 (ex: the display 150) may include a panel 262, a hologram device 264, or a projector 266. The panel 262 may be, for example, a liquid crystal display (LCD), or an active-matrix organic light-emitting diode (AM-OLED), and the like. The panel 262 may be implemented, for example, such that it is flexible, transparent, or wearable. The panel 262 may be configured as one module together with the touch panel 252. The hologram device 264 may show a three-dimensional image in the air using interferences of light. The projector 266 may project light onto a screen to display an image. The screen may be positioned, for example, inside or outside the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included, for example, in the communication interface 160 illustrated in FIG. 1. Additionally or alternatively, the interface 270 may include a mobile high-definition link (MHL) interface, a secure digital (SD) card/multi-media card (MMC) interface, or an infrared data association (IrDA) standard interface.

The audio module 280 may convert a sound and an electric signal in dual directions. At least a partial element of the audio module 280 may be included, for example, in the I/O interface 140 illustrated in FIG. 1. The audio module 280 may process sound information input or output via, for example, a speaker 282, a receiver 284, an earphone 286, or a microphone 288, and the like.

The camera module 291 is a device that may shoot a still image and a moving picture. According to an embodiment, the camera module 291 may include one or more image sensors (ex: a front sensor or a rear sensor), a lens (not shown), an image signal processor (ISP) (not shown), or a flash (not shown) (ex: an LED or xenon lamp).

The power management module 295 may manage power of the electronic device 201.

Though not shown, the power management module 295 may include, for example, a power management integrated circuit (PMIC), a charger integrated circuit (IC), or a battery or a battery or fuel gauge.

The PMIC may be mounted, for example, inside an integrated circuit or an SoC semiconductor. A charging method may be classified into a wired charging method and a wireless charging method. The charging IC may charge a battery and prevent introduction of an overvoltage or an overcurrent from a charger. According to an embodiment, the charging IC may include a charging IC for at least one of the wired charging method and the wireless charging method. The wireless charging method may be, for example, a magnetic resonance method, a magnetic induction method, or an electromagnetic wave method, and the like, and may additionally include an additional circuit for wireless charging, for example, a circuit such as a coil loop, a resonance circuit, or a rectifier, and the like.

The battery gauge may measure, for example, a remnant of the battery 296, a voltage, a current, or a temperature while charging. The battery 296 may store or generate electricity, and supply power to the electronic device 201 using the stored or generated electricity. The battery 296 may include, for example, a rechargeable battery or a solar battery.

The indicator 297 may display a specific state of the electronic device 201 or a portion thereof (ex: the AP 210), for example, a booting state, a message state, or a charging state, and the like. The motor 298 may convert an electric signal to mechanical vibration. Though not shown, the electronic device 201 may include a processor (ex: a GPU) for supporting a mobile TV. The processor for supporting the mobile TV may process media data corresponding to standards, for example, such as digital multimedia broadcasting (DMB), digital video broadcasting (DVB), or a media flow, and the like.

Each of the above-described elements of the electronic device according to various embodiments of the present disclosure may be configured using one or more components, and a name of a relevant element may change depending on a kind of the electronic device. An electronic device according to various embodiments of the present disclosure may include at least one of the above-described elements, and a portion of the elements may be omitted, or additional other elements may be further included. Also, a portion of the elements of the electronic device according to various embodiments of the present disclosure may combine to form one entity and equally perform a function of the relevant elements before the combination.

Figure 3:
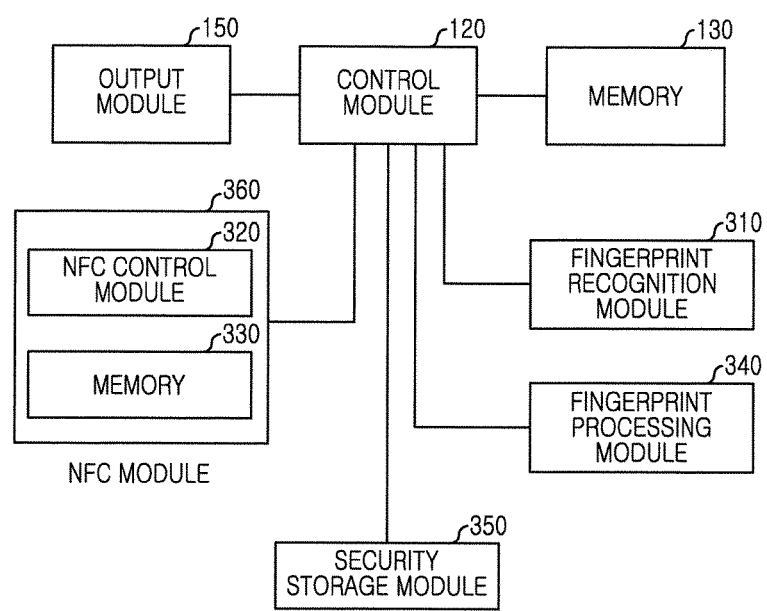
FIG. 3 illustrates a block diagram showing an electronic device according to various embodiments of the present disclosure.

FIG. 3 illustrates a block diagram showing an electronic device according to various embodiments of the present disclosure. According to various embodiments of the present disclosure, the electronic device may include a control module 120, a memory 130, an output module 150, a fingerprint recognition module 310, a fingerprint processing module 340, a security storage module 350, and a near field communication module 360. According to various embodiments, the control module 120 may receive first fingerprint data which the fingerprint recognition module 310 has received from a user. According to an embodiment, the control module 120 may transmit the first fingerprint data received from the fingerprint recognition module 310 to the memory 130. According to an embodiment, the control module 120 may obtain the first fingerprint data stored in the memory 130 to transmit the same to the fingerprint processing module 340. According to an embodiment, the control module 320 may receive information that the first fingerprint data is the same as second fingerprint data stored in the fingerprint processing module 340 from the fingerprint processing module 340 to obtain an access right that may access the security storage module 350. According to an embodiment, the control module 120 may call personal information requested by a second electronic device among a plurality of personal information stored in the security storage module 350 to input the called personal information to the memory 130. According to an embodiment, the control module 120 may call personal information stored in the memory 130 to transmit the same to the near field communication module 360.

According to various embodiments, the fingerprint recognition module 310 may receive a user's fingerprint according to the user's input. According to an embodiment, the fingerprint recognition module 310 may detect first fingerprint data input from the user. According to an embodiment, the first fingerprint data may be fingerprint data newly input every time by the user. According to an embodiment, the fingerprint recognition module 310 may perform a function as a portion of the I/O interface 140.

According to various embodiments, the memory 130 may receive first fingerprint data from the control module 120 and store the same. According to an embodiment, the memory 130 may receive at least one item of personal information from the control module 120 and store the same.

According to various embodiments, the fingerprint processing module 340 may store second fingerprint data of an authorized user. According to an embodiment, the fingerprint processing module 340 may receive input first fingerprint data from the control module 120. According to an embodiment, the fingerprint processing module 340 may determine sameness of first fingerprint data received from the control module 120 and stored second fingerprint data. According to an embodiment, when determining that the first fingerprint data and the second fingerprint data have sameness equal to or greater than set sameness, the fingerprint processing module 340 may transmit information that the first fingerprint data and the second fingerprint data are the same to the control module 120. According to an embodiment, as illustrated in FIG. 3, the fingerprint processing module 340 may be provided separately, but may be included in the control module 120.

According to various embodiments, the security storage module 350 may include at least one of a SIM card, a Universal IC Card (UICC), and an embedded Secure Element, and store a plurality of personal information in at least one region. According to an embodiment, the security storage module 350 may transmit personal information requested by the control module 120 that has obtained an access right to the control module 120. According to an embodiment, the security storage module 350 may store personal information obtained via near field communication. According to an embodiment, the security storage module 350 may store personal information obtained from an optical character reader. According to an embodiment, the security storage module 350 may store personal information input from a user. According to an embodiment, an operation of performing a user's fingerprint authentication during the above-described input process may be added.

According to various embodiments, the near field communication module 360 may include a near field communication controller 320 and a memory 330 separately provided to the near field communication module 360. The near field communication module 360 may transmit personal information requested by the control module 120 to a second electronic device. According to an embodiment, the near field communication module 360 may receive information regarding an authentication result from the second electronic device.

According to various embodiments, the output module 150 may output various items of information transmitted from the control module 120 to a display and display the same. According to an embodiment, the output module 150 may output an audio.

According to various embodiments, a first electronic device may include a processor set to determine sameness of input first fingerprint data and stored second fingerprint data, obtain an access right of a security region based on the determination, and obtain at least one of information stored in the security region based on the obtained right; and a communication module set to transmit the obtained information to a second electronic device connected via Near Field Communication.

The information may include personal information.

The first electronic device may further include a display for displaying a set region for receiving the first fingerprint data when detecting at least one of a set input and an input of set electromagnetic abnormality, and the processor may detect that the first fingerprint data is input to the set region.

When detecting an input of a set contact area or more, the processor may detect fingerprint data of the detected contact area, and recognize the detected fingerprint data as the first fingerprint data.

The communication module may perform near field communication with the second electronic device, and may be requested by the second electronic device to transmit one of personal information.

The first electronic device may further include a memory for storing first fingerprint data, and the processor may call the stored second fingerprint data, and determine whether the stored first fingerprint data and the called second fingerprint data have sameness of set sameness or more.

The processor may determine personal information requested by the second electronic device, input personal information obtained from the security region to a set region, and the communication module may obtain the input personal information to transmit the same to the second electronic device.

The security region may include an embedded Secure Element region storing personal information on an applet basis.

The processor may determine that the first fingerprint data and the second fingerprint data are the same, transmit information that the access right has been obtained to at least one application having the access right, and the electronic device may include at least one application that obtains personal information stored in an embedded region positioned inside the security region.

The security region may include at least one of a SIM card, a Universal IC Card (UICC), and an embedded Secure Element.

The processor may update at least one item of personal information stored in the security region.

Figure 4:
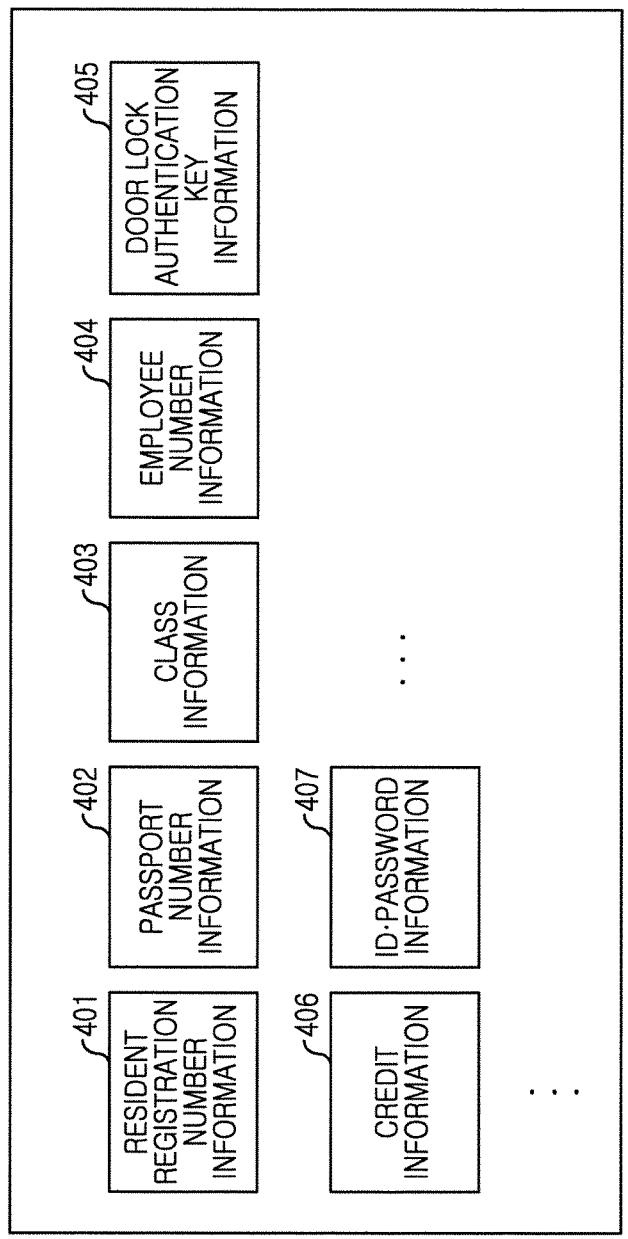
FIG. 4 illustrates a view showing an embodiment of personal information stored in a security region according to various embodiments of the present disclosure.

FIG. 4 illustrates a view showing an embodiment of personal information stored in a security region according to various embodiments of the present disclosure. According to various embodiments, the security region may be a region where various items of personal information are stored. According to an embodiment, the security region may include at least one of a SIM card including a plurality of personal information, a UICC, and an embedded Secure Element. According to an embodiment, the security region may have limited accessibility. For example, the electronic device may access a security region provided to the electronic device only if the electronic device determines that input first fingerprint data and stored second fingerprint data have sameness.

According to an embodiment, when obtaining an access right of a security region, the electronic device may transmit information that it has obtained the access right to at least one application having the access right. According to an embodiment, one or more applications may obtain personal information stored in an embedded region positioned inside the security region.

According to an embodiment, when obtaining an access right that may access the security region, the electronic device may call a plurality of personal information stored in the security region. According to an embodiment, the security region may include an embedded region that stores personal information on an applet basis. According to an embodiment, the electronic device may store at least one item of personal information in the security region on an applet basis, and management of an applet may be performed depending on a key of a Security Domain (SD).

According to various embodiments, personal information of a user of the electronic device may be stored in the security region provided to the electronic device. Referring to FIG. 4, a user's resident registration number information 401, passport number information 402, class information 403, employee information 404, door lock authentication key information 405, credit information 406 used for a credit card, ID and password information 407 used for each information, and the like may be stored in the security region.

FIGS. 5A-5C illustrate views showing receiving a user's fingerprint data according to various embodiments of the present disclosure. According to various embodiments, the electronic device may set a specific region in the electronic device to receive fingerprint data from a user. According to an embodiment, the electronic device may set a specific region of a display of the electronic device to a region that may receive fingerprint data and receive a user's fingerprint data from only the set region.

Referring to FIG. 5A, the electronic device may detect a touch input from a user. According to an embodiment, the electronic device may discriminate an operation of receiving a general touch input from the user and an operation of receiving fingerprint data for performing near field communication. According to an embodiment, when receiving a touch input from the user, when the received touch input is a touch input of less than a set pressure or when detecting a touch input of less than set electromagnetism as the received touch input, the electronic device may perform an operation corresponding to a general touch input. For example, when receiving a touch input of less than set pressure from the user, the electronic device may execute an input application. For another example, when receiving a touch input from the user and detecting the touch input of less than set electromagnetism, the electronic device may display input text in detail and execute an input moving picture.

According to an embodiment, when detecting a touch input of set pressure or more from the user, or detecting a touch input of set electromagnetism or more from the user, the electronic device may detect fingerprint data input from the user.

Referring to FIG. 5B, when detecting a touch input of set pressure or more or set electromagnetism or more from a user, the electronic device may determine whether the input region is a set fingerprint authentication region 501. According to an embodiment, when determining that a region input from the user is not the set fingerprint authentication region 501, the electronic device may display the set fingerprint authentication region 501 and simultaneously display a guide message 502 of "fingerprint authentication region". According to an embodiment, when determining that a region input from the user is not the set fingerprint authentication region 501, the electronic device may display the set fingerprint authentication region 501 and simultaneously output the guide message 502 of "fingerprint authentication region" as audio. Referring to FIG. 5C, after displaying the set fingerprint authentication region 501 on the display of the electronic device, the electronic device may receive the user's fingerprint data from the displayed fingerprint authentication region 501. Though the fingerprint authentication region has been set to a left lower end of the electronic device in the present embodiment, this is only one embodiment and any region of the display of the electronic device may be used as the fingerprint authentication region. A different region, which is not the display region, may become the fingerprint authentication region. According to an embodiment, a backside or a lateral side of the electronic device may become the fingerprint authentication region.

Figure 6:
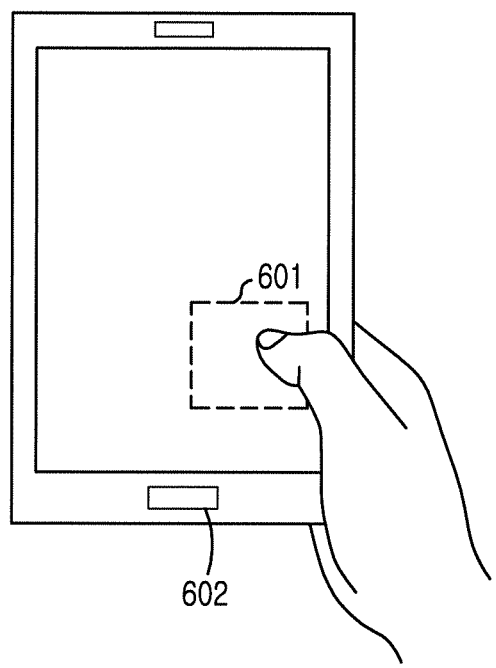
FIG. 6 illustrates a view showing an embodiment of receiving a user's fingerprint data according to various embodiments of the present disclosure.

FIG. 6 illustrates a view showing an embodiment of receiving a user's fingerprint data according to various embodiments of the present disclosure. According to various embodiments, when detecting a touch input from a user, an electronic device may determine whether a detected contact area is equal to or greater than a set area. According to an embodiment, when determining that a contact area detected from the user is the set contact area or more, the electronic device may detect fingerprint data of the detected contact area.

Referring to FIG. 6, when detecting a touch input of a set contact area or more from a user, the electronic device may store input fingerprint data as first fingerprint data. According to an embodiment, the electronic device may determine sameness of the first fingerprint data and second fingerprint data stored in advance.

According to various embodiments, there is no limitation in a fingerprint authentication region for receiving the first fingerprint data from a user, and various regions may be the fingerprint authentication region. According to an embodiment, a left lower region of the electronic device may be a fingerprint authentication region 601, and all regions of a display module of the electronic device may be the fingerprint authentication region. According to an embodiment, the electronic device may set a lower end region of the electronic device as a fingerprint authentication region 602, and set a backside of the electronic device as a fingerprint authentication region (not shown).

According to various embodiments, the electronic device may set a fingerprint of a thumb of a user as first fingerprint data, and set a fingerprint of one of ten fingers of the user defined in advance as the first fingerprint data.

Figure 7:
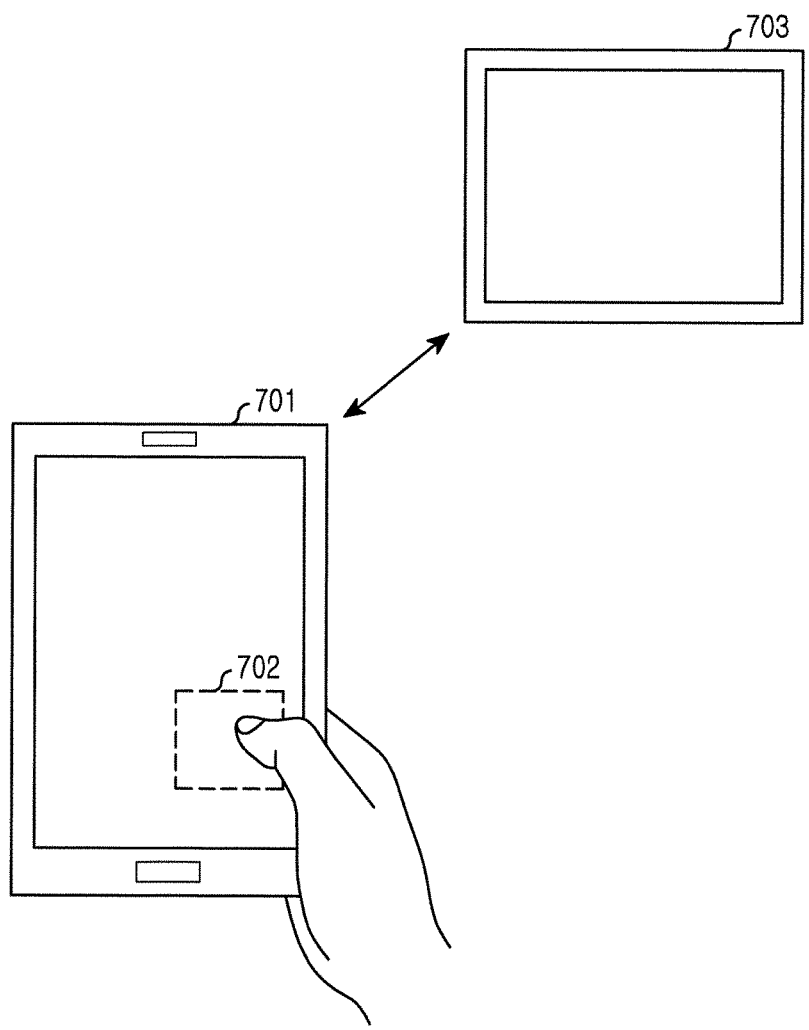
FIG. 7 illustrates a view showing various embodiments where a first electronic device and a second electronic device perform near field communication according to various embodiments of the present disclosure.

FIG. 7 illustrates a view showing various embodiments where a first electronic device and a second electronic device perform near field communication according to various embodiments of the present disclosure. Referring to FIG. 7, the first electronic device 701 may receive a user's fingerprint data from a fingerprint authentication region 702 of the first electronic device. According to an embodiment, the first electronic device 701 may determine whether the first fingerprint data input from the user and stored second fingerprint data have sameness of set sameness or more. According to an embodiment, description is made when the electronic device 701 is set to recognize sameness of fingerprint data only if it is determined that sameness of first fingerprint data newly input every time and stored second fingerprint data is 70 percent or more.

In the above example, when determining that the first fingerprint data input from the user and the stored second fingerprint data have sameness of 70 percent, the first electronic device 701 may allow an access of a security region where a user's personal information has been stored. Hereinafter, each embodiment is described in detail when a second electronic device 703 is a specific electronic device.

According to various embodiments, when the second electronic device 703 is a common terminal installed to determine a student attendance inside a school is described. According to an embodiment, when the first electronic device 701 is positioned within a distance set for performing near field communication with the second electronic device 703 installed inside a school, the first electronic device 701 may be requested by the second electronic device 702 to transmit class information of a student.

According to an embodiment, to transmit class information requested by the second electronic device 703 to the second electronic device 703, the first electronic device 701 may call student information from a security region whose access right has been allowed. According to an embodiment, the first electronic device 701 may call class information input to a set region to transmit the same to the second electronic device 703 via a near field communication module.

According to various embodiments, description is made when the second electronic device 703 is a card payment machine inside a store. According to an embodiment, when the first electronic device 701 is positioned within a distance set for performing near field communication with the second electronic device 703 installed inside a store, the first electronic device 701 may be requested by the second electronic device 702 to transmit credit information for a user's card payment.

According to an embodiment, to transmit the credit information requested by the second electronic device 703 to the second electronic device 703, the first electronic device 701 may call the credit information from a security region whose access right has been allowed. According to an embodiment, the first electronic device 701 may input the credit information called from the security region to a set region. According to an embodiment, the first electronic device 701 may call credit information input to the set region and transmit the same to the second electronic device 703 via a near field communication module.

According to various embodiments, description is made when the second electronic device 703 is a locked door positioned inside a user's home or company. According to an embodiment, when the first electronic device 701 is positioned within a distance set for performing near field communication with the second electronic device 703 installed inside a home or company, the first electronic device 701 may be requested by the second electronic device 702 to transmit the user's door lock authentication key information.

According to an embodiment, to transmit the door lock authentication key information requested by the second electronic device 703 to the second electronic device 703, the first electronic device 701 may call the door lock authentication key information from a security region whose access right has been allowed. According to an embodiment, the first electronic device 701 may input the door lock authentication key information called from the security region to a set region. According to an embodiment, the first electronic device 701 may call the door lock authentication key information input to the set region and transmit the same to the second electronic device 703 via near field communication module.

According to various embodiments, description is made to a case where the second electronic device 703 is a terminal that obtains an examinee's personal information. According to an embodiment, when the first electronic device 701 is positioned within a distance set for performing near field communication with the second electronic device 703 that may determine the examinee's personal information, the first electronic device 701 may be requested by the second electronic device 702 to transmit the examinee's personal information.

According to an embodiment, to transmit the examinee's personal information requested by the second electronic device 703 to the second electronic device 703, the first electronic device 701 may call the examinee's personal information from a security region whose access right has been allowed. According to an embodiment, the first electronic device 701 may input the examinee's personal information called from the security region to a set region. According to an embodiment, the first electronic device 701 may call the examinee's personal information input to the set region and transmit the same to the second electronic device 703 via near field communication module.

In the present embodiment, the first electronic device may receive fingerprint data from a user, determine sameness of the input fingerprint data, and then perform near field communication with the second electronic device. According to an embodiment, the first electronic device may perform near field communication with the second electronic device first, and then perform an operation of obtaining a user's personal information requested by the second electronic device.

Figure 8:
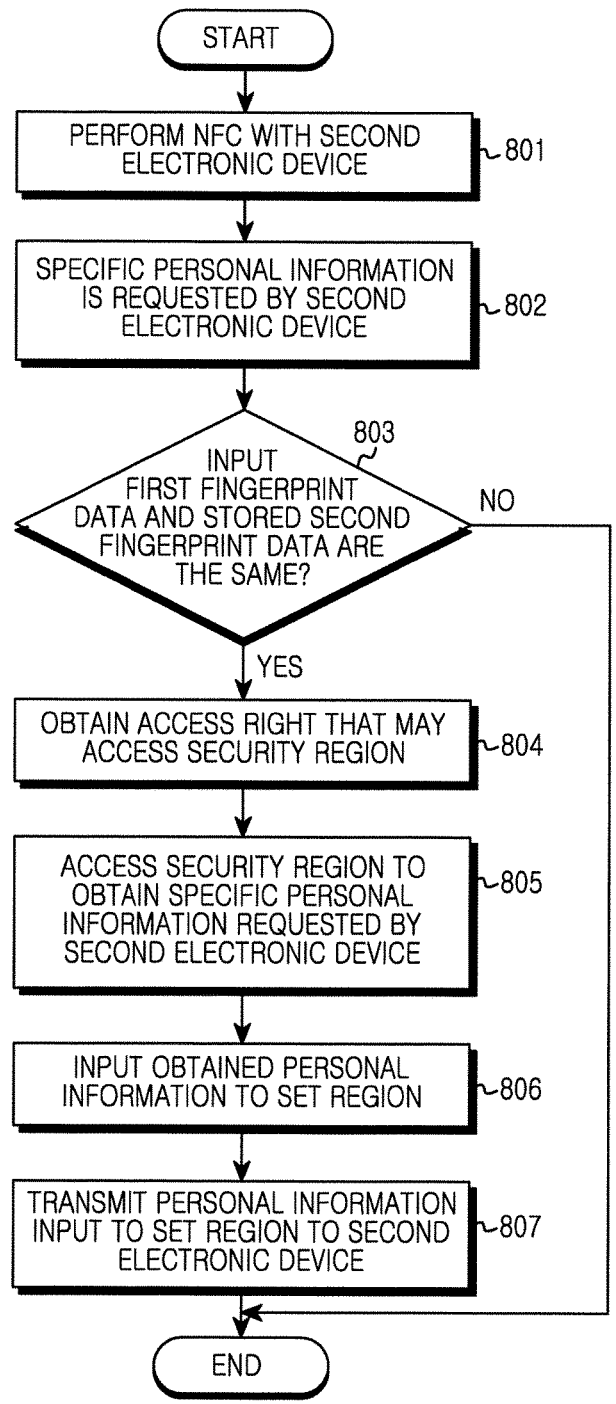
FIG. 8 illustrates a process of a first electronic device according to various embodiments of the present disclosure.

FIG. 8 illustrates a process of a first electronic device according to various embodiments of the present disclosure. Referring to FIG. 8, the first electronic device may perform near field communication with a second electronic device in operation 801. According to an embodiment, when the first electronic device and the second electronic device are positioned within a set distance, the first electronic device may perform near field communication with the second electronic device.

In operation 802, the first electronic device may be requested by the second electronic device to transmit specific personal information. According to an embodiment, the first electronic device may be requested by the second electronic device to transmit at least one of resident registration number information, passport number information, class information, employee information, credit information, and ID password information.

In operation 803, the first electronic device may determine whether input first fingerprint data and stored second fingerprint data are the same. According to an embodiment, when the first electronic device is set to accept sameness of fingerprint data only if it is determined that sameness of first fingerprint data newly input every time and stored second fingerprint data is 70 percent or more, the first electronic device may determine whether sameness of the input first fingerprint data and the stored second fingerprint data is 70 percent or more.

In operation 804, when the input fingerprint data and the stored second fingerprint data are the same, the first electronic device may obtain an access right that may access a security region. According to an embodiment, when the first electronic device determines that the first fingerprint data input from a user and the stored second fingerprint data have sameness of 70 percent, the first electronic device may allow an access of a security region where the user's personal information has been stored.

In operation 805, the first electronic device may access the security region to obtain the specific personal information requested by the second electronic device. According to an embodiment, when the first electronic device is requested by the second electronic device to transmit a user's resident registration number, the first electronic device may obtain resident registration number among a plurality of personal information stored in the security region.

In operation 806, the first electronic device may input the obtained personal information to a set region. According to an embodiment, the first electronic device may input the obtained personal information to a set region such as a memory, and the like.

In operation 807, the first electronic device may transmit the personal information input to the set region to the second electronic device. According to an embodiment, when the first electronic device is requested by the second electronic device to transmit passport information, the first electronic device may transmit the passport information input to the set region to the second electronic device.

In operation 803, when the first electronic device determines that the inputted first fingerprint data and the stored second fingerprint data are not the same, the first electronic device may end the operation.

Figure 9:
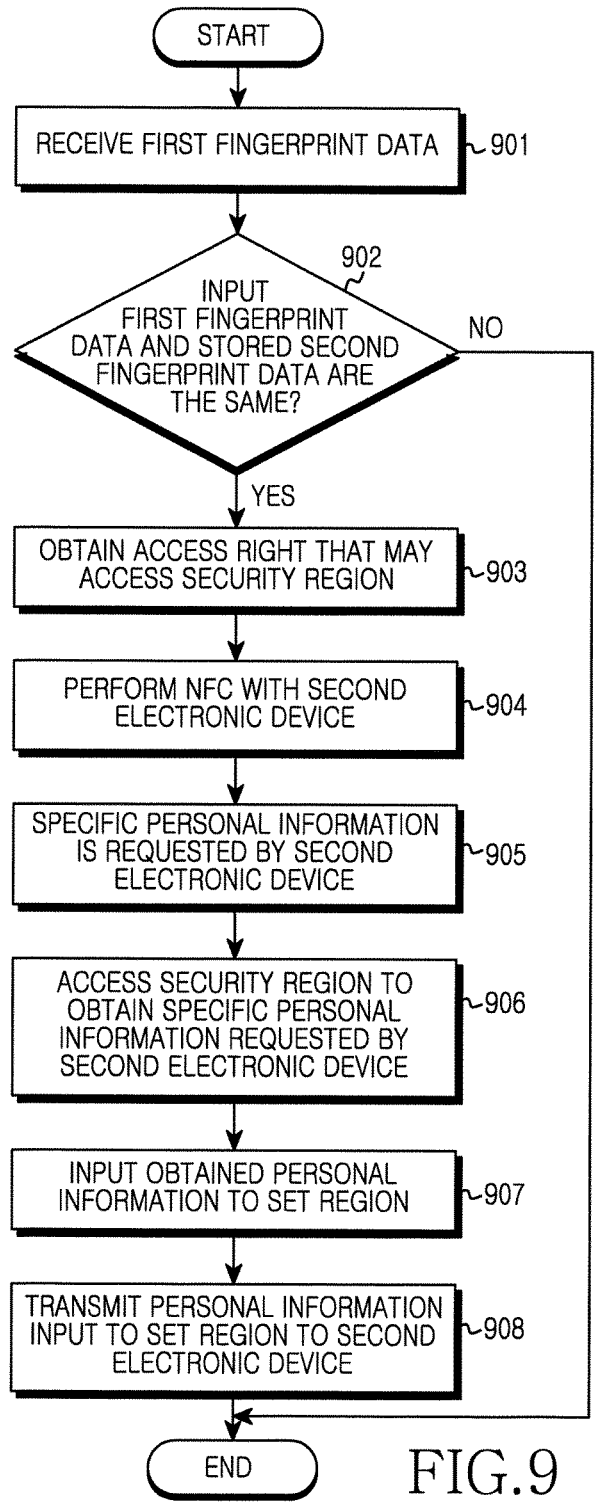
FIG. 9 illustrates a process of a first electronic device according to various embodiments of the present disclosure.

FIG. 9 illustrates a process of a first electronic device according to various embodiments of the present disclosure. Referring to FIG. 9, the first electronic device may receive first fingerprint data in operation 901. According to an embodiment, when detecting a touch input from a user, the first electronic device may determine whether a detected contact area is equal to or greater than a set area. According to an embodiment, when the electronic device determines the contact area detected from the user is equal to or greater than the set contact area, the electronic device may detect first fingerprint data of the detected contact area.

In operation 903, the first electronic device may determine whether the input first fingerprint data and stored second fingerprint data are the same. According to an embodiment, when the first electronic device is set to accept sameness of fingerprint data only if it is determined that sameness of first fingerprint data newly input every time and stored second fingerprint data is 70 percent or more, the first electronic device may determine whether sameness of the input first fingerprint data and the stored second fingerprint data is 70 percent or more.

In operation 903, when whether the input first fingerprint data and the stored second fingerprint data are the same, the first electronic device may obtain an access right that may access a security region. According to an embodiment, when the first electronic device determines that the first fingerprint data input from a user and the stored second fingerprint data have sameness of 70 percent, the first electronic device may allow an access of a security region where the user's personal information has been stored.

In operation 904, the first electronic device may perform near field communication with the second electronic device. According to an embodiment, when the first electronic device and the second electronic device are positioned within a set distance, the first electronic device may perform near field communication with the second electronic device.

In operation 905, the first electronic device may be requested by the second electronic device to transmit specific personal information. According to an embodiment, the first electronic device may be requested by the second electronic device to transmit at least one of resident registration number information, passport number information, class information, employee information, credit information, and ID password information.

In operation 906, the first electronic device may access the security region to obtain the specific personal information requested by the second electronic device. According to an embodiment, when the first electronic device is requested by the second electronic device to transmit a user's resident registration number, the first electronic device may obtain resident registration number among a plurality of personal information stored in the security region.

In operation 907, the first electronic device may input the obtained personal information to a set region. According to an embodiment, the first electronic device may input the obtained personal information to a set region such as a memory, and the like.

In operation 908, the first electronic device may transmit the personal information input to the set region to the second electronic device. According to an embodiment, when the first electronic device is requested by the second electronic device to transmit passport information, the first electronic device may transmit the passport information input to the set region to the second electronic device.

In operation 902, when the first electronic device determines that the inputted first fingerprint data and the stored second fingerprint data are not the same, the first electronic device may end the operation.

Figure 10:
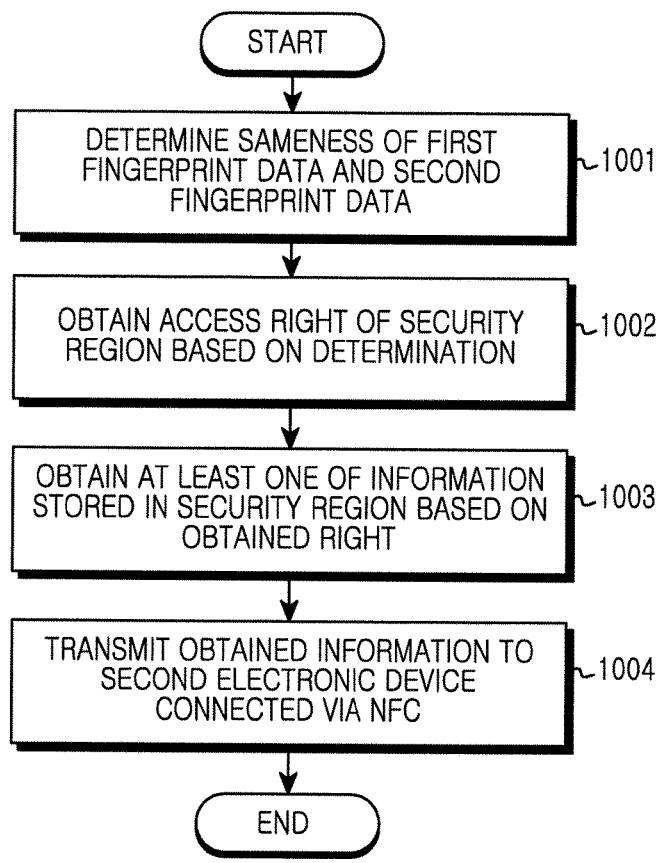
FIG. 10 illustrates a process of a first electronic device according to various embodiments of the present disclosure.

FIG. 10 illustrates a process of a first electronic device according to various embodiments of the present disclosure. Referring to FIG. 10, in operation 1001, the first electronic device may determine sameness of input first fingerprint data and stored second fingerprint data. According to an embodiment, when detecting a touch input from a user, the first electronic device may determine whether a detected contact area is equal to or greater than a set area. According to an embodiment, when the electronic device determines the contact area detected from the user is equal to or greater than the set contact area, the electronic device may detect first fingerprint data of the detected contact area.

In operation 1002, the first electronic device may obtain an access right of a security region based on the determination. According to an embodiment, when determining that the first fingerprint data and the second fingerprint data are the same, the first electronic device may obtain the access right of the security region. According to an embodiment, when the first electronic device determines that the first fingerprint data input from a user and the stored second fingerprint data have sameness of 70 percent, the first electronic device may allow an access of a security region where the user's personal information has been stored.

In operation 1003, the first electronic device may obtain at least one of information stored in the security region based on the obtained right. According to an embodiment, the personal information stored in the security region of the electronic device may be a user's resident registration number information, passport number information, class information, employee information, door lock authentication key information, credit information used for a credit card, ID and password information used for each information, and the like.

In operation 1004, the first electronic device may obtain information obtained by the second electronic device connected via near field communication. According to an embodiment, the first electronic device may obtain one of at least one item of personal information stored in the security region to transmit the obtained personal information to the second electronic device.

According to various embodiments, a method for operating a first electronic device is provided. The method may include: determining sameness of first fingerprint data and second fingerprint data; obtaining an access right of a security region based on the determination; obtaining at least one of information stored in the security region based on the obtained right; and transmitting the obtained information to a second electronic device connected via Near Field Communication.

The information may include personal information.

The method may further include: when detecting at least one of set pressure and an input of set electromagnetism or more, displaying a set region that will receive the first fingerprint data; and detecting that the first fingerprint data is input to the set region.

The method may further include: when detecting an input of a set contact area or more, detecting fingerprint data of the detected contact area; and recognizing the detected fingerprint data as the first fingerprint data.

The method may further include: performing Near Field Communication with the second electronic device; and being requested by the second electronic device to transmit one of personal information.

Determining sameness of first fingerprint data and second fingerprint data may include: storing the first fingerprint data; calling the second fingerprint data; and determining whether the stored first fingerprint data and the called second fingerprint data have sameness of set sameness or more.

Transmitting the obtained information to the second electronic device may include: determining personal information requested by the second electronic device; inputting (writing) personal information obtained from the security region to a set region; and obtaining the input personal information to transmit the same to the second electronic device.

The security region may include an embedded Secure Element storing personal information on an applet basis.

Obtaining the access right of the security region may include: determining the first fingerprint data and the second fingerprint data are the same; transmitting information that the access right has been obtained to at least one application having the access right; and obtaining, at the at least one application, personal information stored in an embedded Secure Element positioned inside the security region.

The security region may include at least one of a SIM card, a Universal IC Card (UICC), and an embedded Secure Element.

The method may further include: updating at least one personal information stored in the security region.

According to various embodiments, at least a portion of an apparatus (ex: modules or functions thereof) or a method (ex: operations) according to various embodiments may be implemented in an instruction stored in a computer-readable storage media, for example, in the form of a programming module. The instruction, when executed by one or more processors (ex: the processor 120), allows the one or more processors to perform a relevant function. The computer-readable storage media may be, for example, the memory 130. At least a portion of the programming module may be, for example, implemented (ex: executed) by the processor 210. At least a portion of the programming module may include, for example, a module, a program, a routine, sets of instructions, or a process, and the like for performing one or more functions.

The computer-readable storage media may include a hard disk, a magnetic media such as a floppy disk and a magnetic tape, Compact Disc Read Only Memory (CD-ROM), optical media such as Digital Versatile Disc (DVD), magneto-optical media such as a floptical disk, and a hardware device specially configured for storing and performing a program instruction (ex: a programming module) such as Read Only Memory (ROM), Random Access Memory (RAM), a flash memory, and the like. Also, the program instruction may include not only a machine language code generated by a compiler but also a high-level language code executable by a computer using an interpreter, and the like. The above-described hardware device may be configured to operate as one or more software modules in order to perform an operation of various embodiments of the present disclosure, and vice versa.

A module or a programming module according to various embodiments of the present disclosure may include at least one of the above-described elements, omit a portion thereof, or further include additional other elements. Operations performed by a module, a programming module, or other elements according to various embodiments of the present disclosure may be executed in a sequential, parallel, or heuristic method. Also, a portion of the operations may be executed in a different sequence, omitted, or other operations may be added.

According to various embodiments, a storage medium storing instructions is provided. The instructions, when executed by at least one processor, are set to allow the at least one processor to perform at least one operation. The at least one operation includes operations of determining sameness of first fingerprint data and second fingerprint data, obtaining an access right of a security region based on the determination, obtaining at least one of information stored in the security region based on the obtained right, and transmitting the obtained information to a second electronic device connected via Near Field Communication.

Also, embodiments of the present disclosure disclosed in the present specification and drawings suggest only a specific example in order to easily explain technical content according to an embodiment of the present disclosure and help understanding of an embodiment of the present disclosure, and are not intended for limiting the scope of an embodiment of the present disclosure. Therefore, it should be construed that the scope of various embodiments of the present disclosure includes not only the embodiments disclosed herein but also all changes and modified forms derived based on the technical spirit of various embodiments of the present disclosure.

What is claimed is:

1. A method for operating a first electronic device, the method comprising:
   receiving a request for information stored in a security region from a second electronic device;
   displaying a fingerprint authentication region to input first fingerprint data in response to detecting at least one of set pressure and an input of set electromagnetism, wherein the fingerprint authentication region corresponds to at least a portion of a display of the first electronic device;
   detecting the first fingerprint data based on the fingerprint authentication region;
   determining whether the first fingerprint data corresponds to a second fingerprint data stored in the first electronic device;
   in response to determining the first fingerprint data corresponds to the second fingerprint data, obtaining an access right of the security region;
   obtaining the information in the security region based on the obtained access right; and
   transmitting the obtained information to the second electronic device connected via near field communication.

2. The method of claim 1, wherein the information comprises personal information.

3. The method of claim 1, wherein determining whether the first fingerprint data corresponds to the second fingerprint data comprises:
   storing the first fingerprint data;
   retrieving the second fingerprint data; and
   determining whether the stored first fingerprint data corresponds to the retrieved second fingerprint data.

4. The method of claim 1, wherein transmitting the obtained information to the second electronic device comprises:
   determining the information requested by the second electronic device;
   obtaining personal information associated with the determined information from the security region; and
   transmitting the obtained personal information to the second electronic device.

5. The method of claim 1, wherein the security region comprises an embedded Secure Element storing information on an applet basis.

6. The method of claim 1, wherein obtaining the information comprises:
   transmitting information that the access right is obtained to at least one application; and
   obtaining, at the at least one application, personal information stored in an embedded Secure Element positioned inside the security region.

7. The method of claim 1, wherein the security region comprises at least one of a Subscriber Identification Module (SIM) card, a Universal Integrated Circuit Card (UICC), and an embedded Secure Element.

8. The method of claim 1, further comprising updating the information stored in the security region.

9. A first electronic device comprising:
   a display;
   a communication interface; and
   a hardware processor configured to:
      receive a request for information stored in a security region from a second electronic device,
      control the display to display a fingerprint authentication region to input first fingerprint data in response to detecting at least one of set pressure and an input of set electromagnetism, wherein the fingerprint authentication region corresponds to at least a portion of the display of the first electronic device,
      detect the first fingerprint data,
      determine whether the first fingerprint data corresponds to a second fingerprint data stored in the first electronic device,
      in response to determining the first fingerprint data corresponds to the second fingerprint data, obtain an access right of the security region,
      obtain the information stored in the security region based on the access right, and
      control the communication interface to transmit the obtained information to the second electronic device connected via near field communication.

10. The electronic device of claim 9, wherein the information comprises personal information.

11. The electronic device of claim 9, further comprising:
    a memory configured to store the detected first fingerprint data,
    wherein the hardware processor is further configured to:
       retrieve the stored second fingerprint data, and
       determine whether the stored first fingerprint data corresponds to the retrieved second fingerprint data.

12. The electronic device of claim 11, wherein the hardware processor is further configured to transmit information that the access right is obtained to at least one application, and wherein the memory is further configured to store at least one application that is configured to obtain personal information stored in an embedded region positioned inside the security region.

13. The electronic device of claim 9, wherein the hardware processor is further configured to:
- determine the information requested by the second electronic device,
- obtain personal information associated with the determined information obtained from the security region and,
- control the communication interface to transmit the obtained personal information to the second electronic device.

14. The electronic device of claim 9, wherein the security region comprises an embedded Secure Element region storing information on an applet basis.

15. The electronic device of claim 9, wherein the security region comprises at least one of a Subscriber Identification Module (SIM) card, a Universal Integrated Circuit Card (UICC), and an embedded Secure Element.

16. The electronic device of claim 9, wherein the hardware processor is further configured to update the information stored in the security region.

* * * * *